United States Patent [19]

Storey et al.

[11] Patent Number: 4,666,978
[45] Date of Patent: May 19, 1987

[54] METHOD OF CURING UNSATURATED POLYESTER RESINS AT LOW TEMPERATURES

[75] Inventors: Robson F. Storey; Sudhakar Dantiki; Melissa L. Hogue, all of Hattiesburg; Arthur C. Bayer, Ocean Springs, all of Miss.

[73] Assignees: First Chemical Corporation, Pascagoula; The University of Southern Mississippi, Hattiesburg, both of Miss.

[21] Appl. No.: 802,312

[22] Filed: Nov. 27, 1985

[51] Int. Cl.⁴ .......................................... C08G 63/76
[52] U.S. Cl. ...................................... 525/35; 525/374
[58] Field of Search ........................... 525/35, 374

[56] References Cited

U.S. PATENT DOCUMENTS

| | | | |
|---|---|---|---|
| 3,137,665 | 6/1964 | Retford | 524/866 |
| 3,725,501 | 4/1973 | Hilbelink et al. | 525/28 |
| 3,903,055 | 9/1975 | Buck | 526/194 |
| 4,374,170 | 2/1983 | Fesko | 525/939 X |

Primary Examiner—Lucille M. Phynes
Attorney, Agent, or Firm—A. W. Breiner

[57] ABSTRACT

Method of promoting the cure of unsaturated polyester resins with a peroxide initiator at room or below room temperatures (low temperatures) by including as a promoter N,N-dimethyl-p-toluidine (DMPT) or a blend of DMPT and N,N-dimethyl-m-toluidine (DMMT) and to the polyester composition containing such promoter. The use of the DMPT or blend of DMPT and DMMT as a promoter provides a fast cure at low temperatures without loss of physical properties of the cured resins.

17 Claims, 6 Drawing Figures

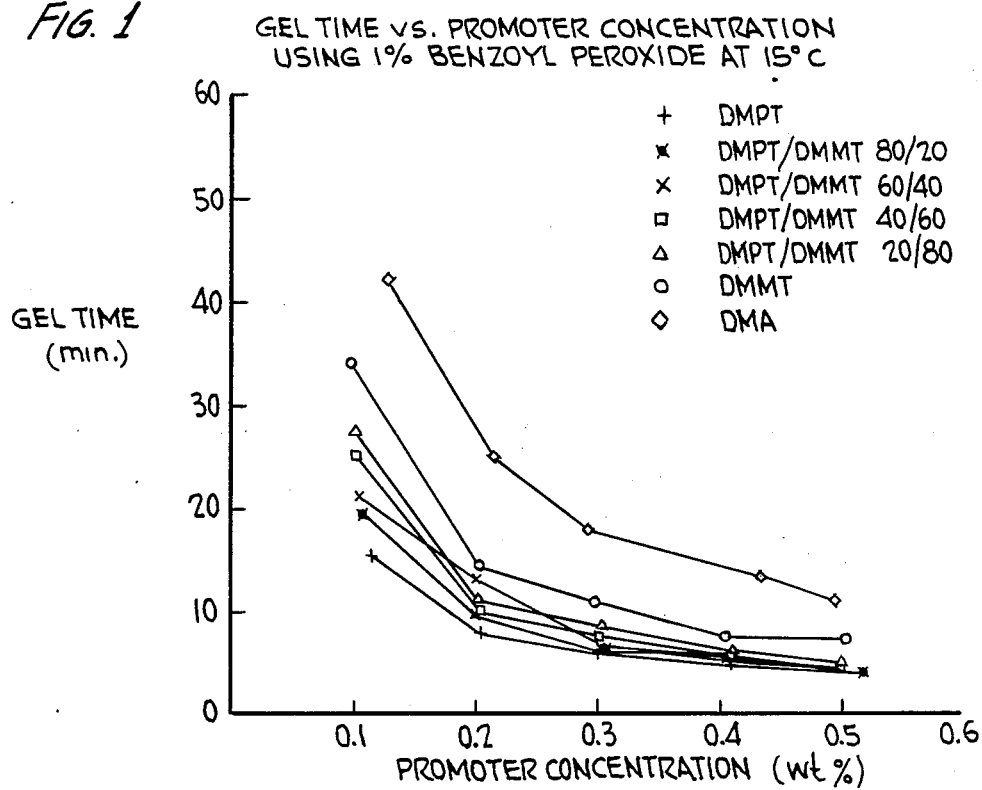
FIG. 1 GEL TIME vs. PROMOTER CONCENTRATION USING 1% BENZOYL PEROXIDE AT 15°C
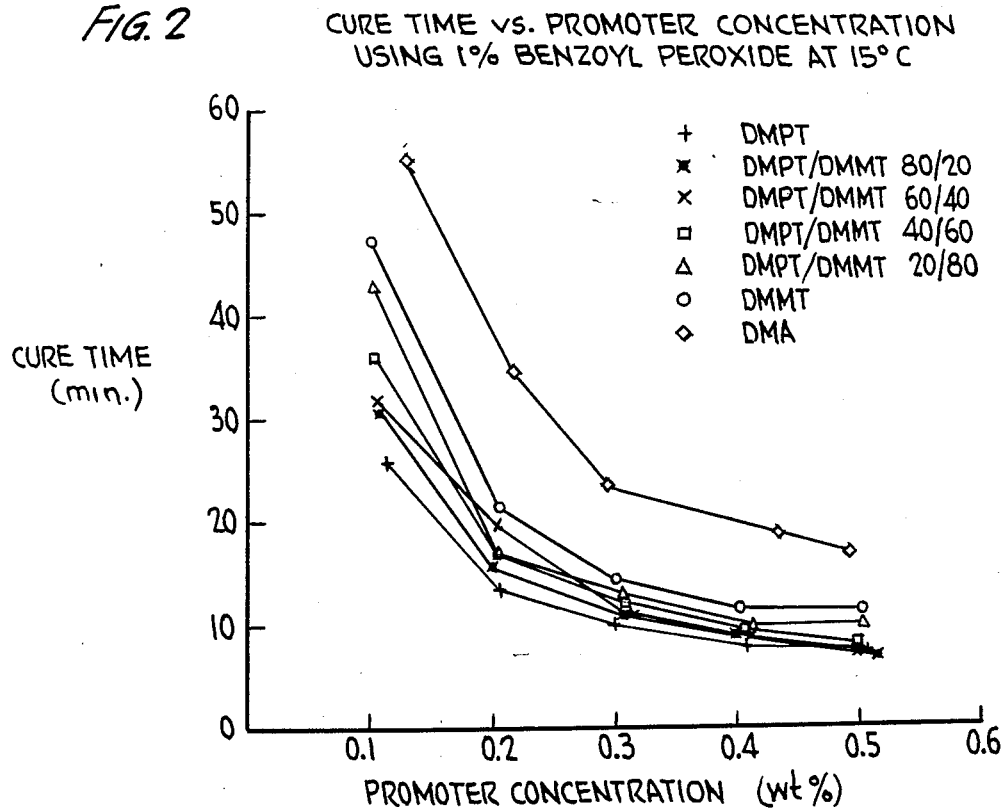
FIG. 2 CURE TIME vs. PROMOTER CONCENTRATION USING 1% BENZOYL PEROXIDE AT 15°C

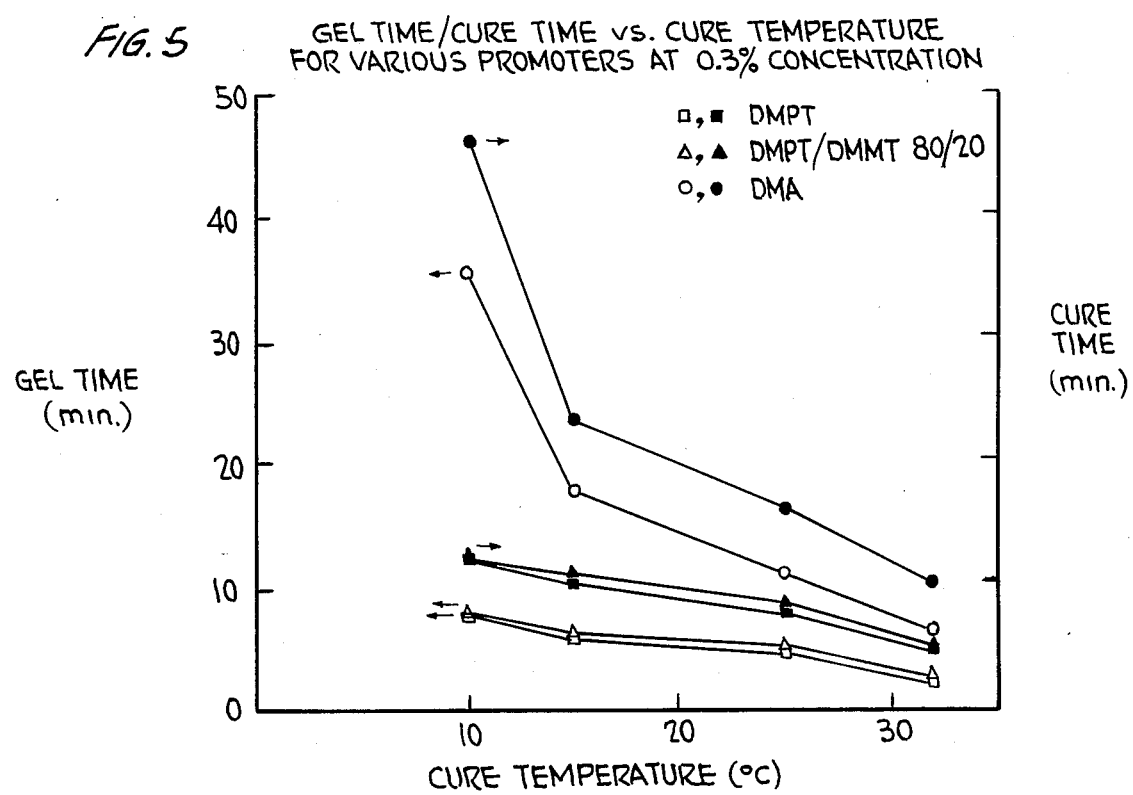
FIG. 5  GEL TIME/CURE TIME vs. CURE TEMPERATURE FOR VARIOUS PROMOTERS AT 0.3% CONCENTRATION
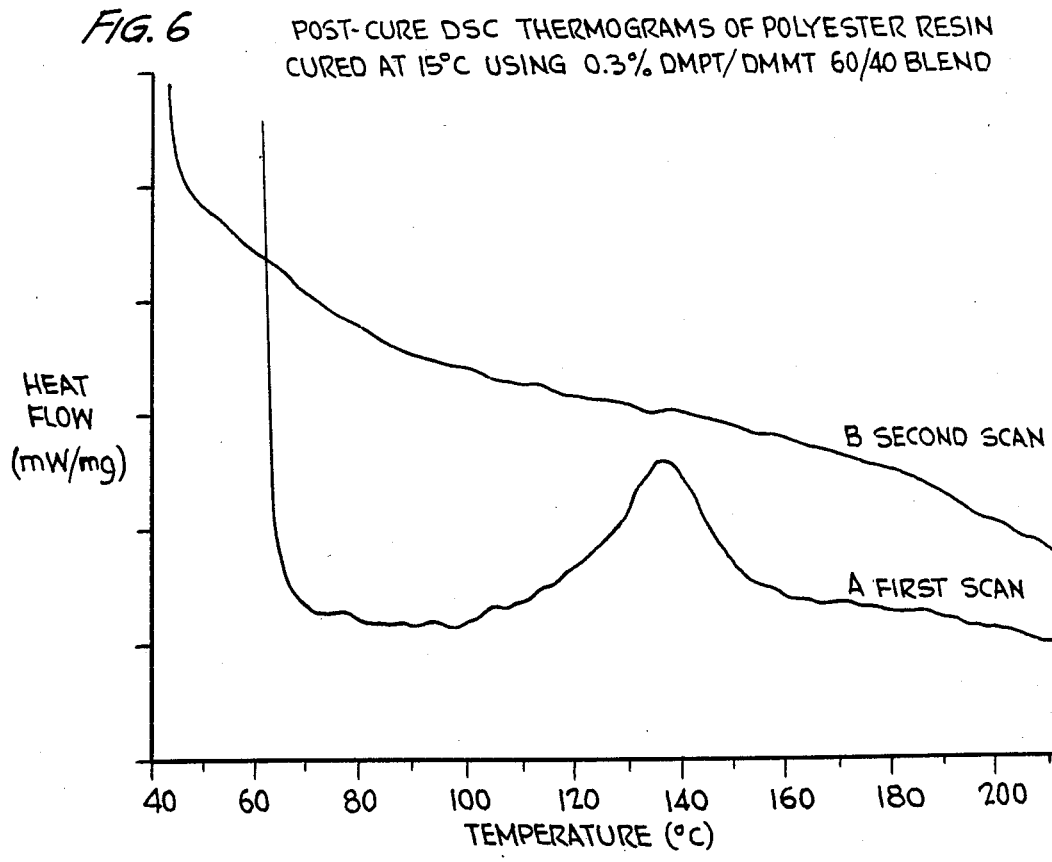
FIG. 6  POST-CURE DSC THERMOGRAMS OF POLYESTER RESIN CURED AT 15°C USING 0.3% DMPT/DMMT 60/40 BLEND

METHOD OF CURING UNSATURATED POLYESTER RESINS AT LOW TEMPERATURES

FIELD OF INVENTION

This invention relates to a method of curing unsaturated polyester resins or mixtures of such resins and a monomer copolymerizable therewith. More particularly, the invention relates to the curing of such resins and mixtures thereof with a peroxide initiator in the presence of a cure promoter.

BACKGROUND OF INVENTION AND PRIOR ART

Polyester resin, as the term is herein used, designates a linear-type alkyd possessing carbon-to-carbon double bond unsaturation in the polymer chain. These unsaturated polyesters may be crosslinked by reaction with monomers such as styrene or diallyl-phthalate usually in the presence of a peroxide to form insoluble and infusible resins without the formation of a by-product during the curing reaction. These polyester resins possess broad commercial utility due to their versatility and cost effectiveness. Such utility includes in the low-pressure laminating field; in the coating field as attractive and durable finishes for concrete, masonry, wood, plastic, wallboard, and metal; new specialty resins targeted for polymer concrete, mine-bolt resins, transfer molding, restorative dentistry, and the like. As a result of the increased applications, particularly since the polyester resins for many applications must be used outdoors where temperatures cannot be easily controlled, it has become essential to increase the cure rates of such polyester resins at low temperatures without detracting from the physical properties of the resins. While the use of promoters such as the tertiary amines, including dimethylaniline and diethylaniline, in the curing of the unsaturated polyester resins, with a peroxide initiator is known, the effectivenss of such promoters falls off dramatically at low temperatures. While the dimethyltoluidines are known cure promoters, they have not been recognized to have unusual effectiveness at low temperatures.

Accordingly, there is a need for more effective cure promoters which will provide a fast cure at low temperatures without adversely affecting the physical properties of the cured resins.

OBJECTS AND GENERAL DESCRIPTION OF INVENTION

It is a primary object of the present invention, therefore, to provide a cure promoter for curing unsaturated polyester resins in the presence of a peroxide initiator which will provide a fast cure at low temperatures without adversely affecting the physical properties of the resins.

It is another primary object of the present invention to provide a cure promoter which is relatively inexpensive and thus cost effective for curing unsaturated polyester resins in the presence of a peroxide initiator.

These and other objects of the present invention will become apparent from the following general and detailed description of the invention.

The objects of the present invention are accomplished based on the discovery that while N,N-dimethyl-p-toluidine (DMPT) is a highly effective cure promoter at room temperature and at slightly elevated temperatures, DMPT and blends of DMPT and N,N-dimethyl-m-toluidine (DMMT) are also very effective promoters at temperatures as low as 10° C. and lower. This is unexpected and surprising since dimethylaniline, a common commercially-used aromatic tertiary amine promoter, dramatically loses its effectiveness as a promoter below room temperature.

The discovery of this invention is particularly commercially significant with respect to the mixtures or blends of DMPT and DMMT since DMMT is not an effective promoter when used alone. The ability to use a mixture or blend of the dimethyltoluidines is highly cost effective since the dimethyltoluidines are usually prepared as a mixture of meta and para isomers. By using the promoters as a mixture or blend, it is not necessary to go through the costly and time-consuming step of separating the para and meta isomers. Rather, the materials can be used substantially as prepared.

Having described the invention in general terms, presently preferred embodiments in comparison to dimethylaniline are being set forth.

DESCRIPTION OF PRESENTLY PREFERRED EMBODIMENTS

BRIEF DESCRIPTION OF DRAWING

FIG. 1 is a graph showing gel time versus promoter concentration using 1% benzoyl peroxide at 15° C.;

FIG. 2 is a graph showing cure time versus promoter concentration using 1% benzoyl peroxide at 15° C.;

FIG. 5 is a graph showing gel time/cure time versus cure temperature for various promoters at 0.3% concentration; and FIG. 6 is a graph showing post-cure DSC thermograms of polyester resin cured at 15° C. using 0.3% DMPT/DMMT 60/40 blend.

Materials

Figure 3:
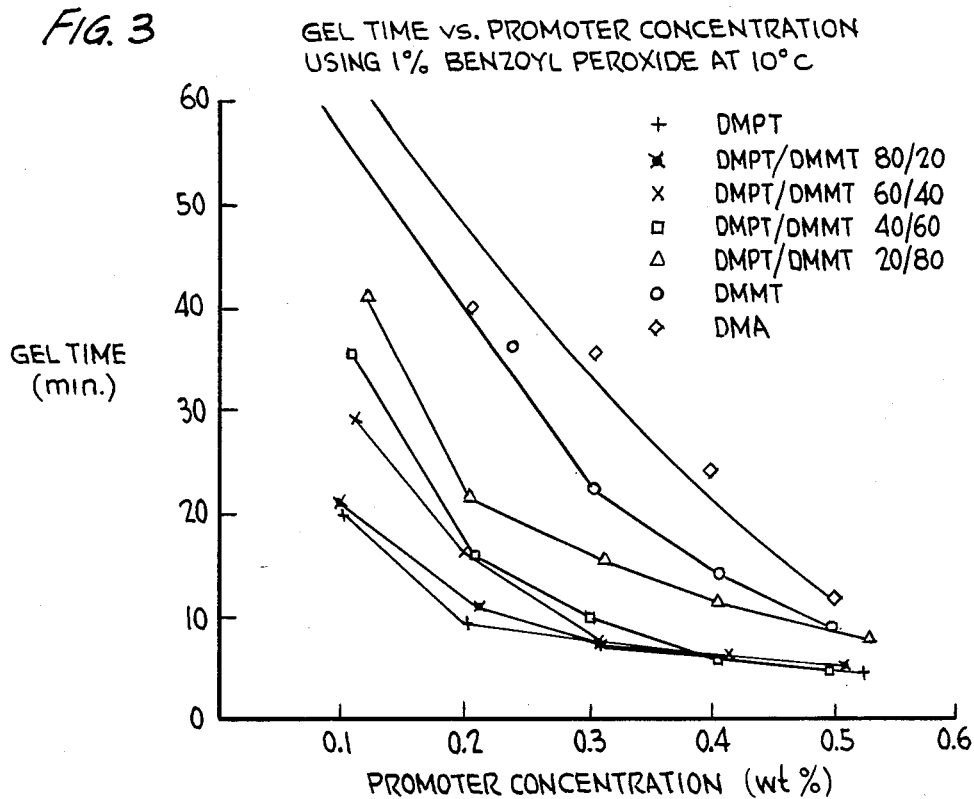
FIG. 3 is a graph showing gel time versus promoter concentration using 1% benzoyl peroxide at 10° C.

DMA—a technical grade commercial product.
DMPT—a technical grade commercial product.
DMMT—a technical grade commercial product.
DMPT and DMMT Mixture–a blend of technical grade DMPT and DMMT.
Benzoyl Peroxide (BP)–used as a 50% dispersion in tricresyl phosphate.
Polyester Resin–an unpromoted, low-reactivity resin based on ortho phthalic acid and containing 32-36% free styrene monomer, available under the trademark "Polylite 31-001" from the Reichold Chemical Company.

| Base Formulation for Cure Reactions | |
| --- | --- |
| Benzoyl peroxide dispersion (50%) | 2.00 g |
| Tertiary aromatic amine | 0.1–0.5 g |
| Polyester resin | Balance |
| Total Mass | = 100 g |

Scope of Tests

DMPT, DMMT, and their isomeric blends were compared to DMA using the basic formulation given above. For simplicity, no inhibitors were added. Characteristic gel time, cure time, and hardness of cured resin samples were measured. Differential scanning calorimetry (DSC) was used to estimate the degree of cure from the post-cure peak exotherm and the glass transition temperature ($T_g$) of selected samples.

Procedure

All curing reactions were performed at 15° C. (60° F.) or 10° C. (50° F.) using a wide-mouth one-half pint mason jar suspended in a constant temperature water bath. A reacting mass of 100 g was used in all cases. The procedure utilized was as follows: The amine promoter was weighed into a clean, dry jar to an accuracy of ±0.001 g using a ground glass syringe for transfer. The proper quantity of resin was then weighed into the jar. The jar was placed into the constant temperature water bath and allowed to equilibrate for 30 minutes. Next, 2±0.0075 g BP dispersion was weighed onto the end of a wooden tongue blade. A lab timer was activated, and the BP dispersion was mixed thoroughly into the resin by stirring for three minutes with the blade, gently to avoid air entrapment. The reacting mass was probed periodically with the blade, and the gel time was recorded as the time from introduction of the initiator to the point when the resin snapped back from the blade in a rubbery manner. Next, a thermometer wrapped in aluminum foil was inserted into the center of the gelled resin. The cure time was recorded as the time from addition of the initiator to the peak exotherm, i.e., the maximum temperature reached.

Barcol hardness of cured samples was determined 24 hours after initiator injection using a Barber-Colman Impressor (model GYZJ 934-1).

DSC (DuPont 910 DSC attached to a 9900 thermal analyzer) was carried out on small portions (10-20 mg) of the cured samples after about six weeks of storage at room temperature. All thermograms were produced using a programmed heating rate of 10° C./min. and a nitrogen atmosphere. All samples were subjected to two scans starting at room temperature and ending at an appropriate temperature well above the $T_g$. During the first scan a broad exotherm occurred, representing conversion of residual unsaturation within the sample. The initial temperature, $T_i$, at which the post-cure begins and the post-cure peak exotherm, $T_m$, at which the maximum rate of cure takes place, were measured from the first DSC scan of the cured resin. The sample was then cooled and a second DSC thermogram was recorded to measure the glass transition temperature. The $T_g$ was defined as the first change in the slope of the thermogram.

Results and Analysis of Results

Figure 4:
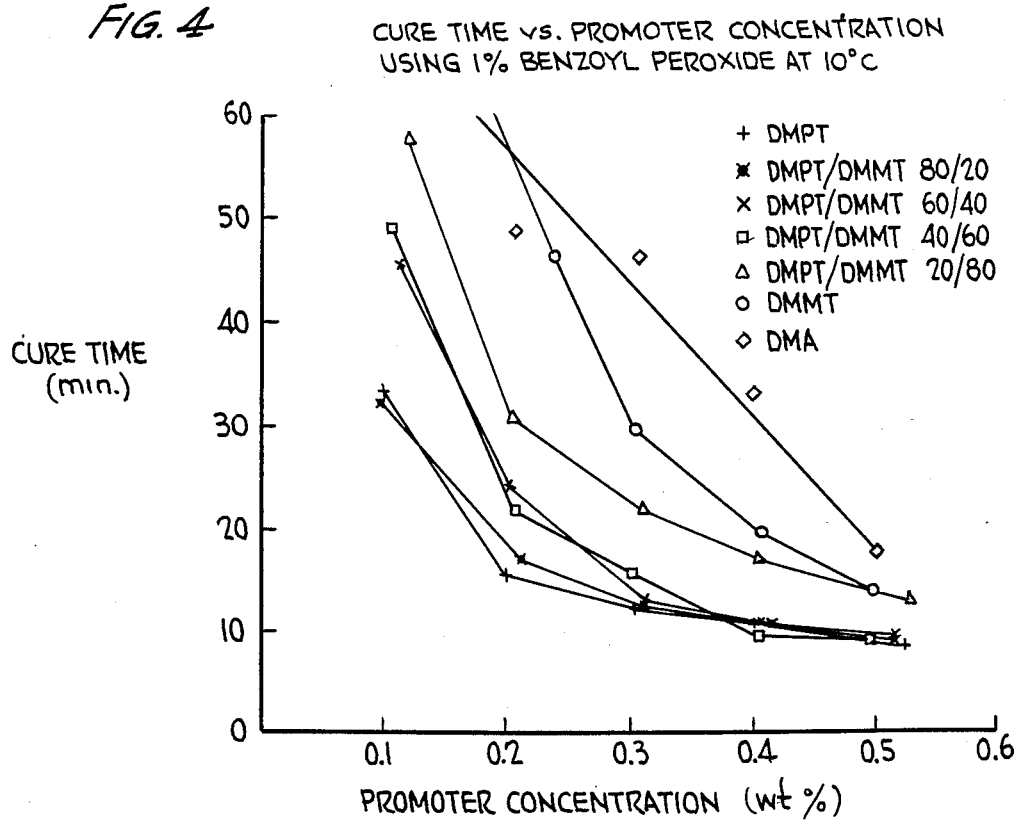
FIG. 4 is a graph showing cure time versus promoter concentration using 1% benzoyl peroxide at 10° C.

DMPT, DMMT, and DMPT/DMMT blends in the weight ratios 80:20, 60:40, 40:60, and 20:80 were compared to DMA as cure reaction promoters at five different concentrations (0.1 to 0.5% by weight) for the test unsaturated polyester resin. All the curing reactions were performed using 1% benzoyl peroxide as initiator at two different reaction temperatures (15° C. and 10° C.). The effect of promoter concentration on the gel and cure times at these two reaction temperatures is depicted in FIGS. 1-4. At 15° C., DMPT produced rates of gel and cure 2.5 to 3 times higher than DMA (FIGS. 1 and 2). The efficiency difference was more pronounced at 10° C. with 4 to 4.5 fold faster gel and cure times with DMPT promoter (FIGS. 3 and 4). The superior performance of DMPT over DMA at low temperatures is best determined from a plot of gel time/cure time versus cure temperature, as shown in FIG. 5 for DMPT, DMA, and 80:20 DMPT/DMMT.

It can be seen that the promotion efficiency of DMA decreases precipitously as the temperature is lowered below room temperature. In fact, the reaction of DMA promoted systems at 10° C. was so slow that a distinct gel time could not be discerned, i.e., the samples did not undergo a sudden, homogeneous gelation. In contrast, the efficiency of DMPT and 80:20 DMPT/DMMT is reduced only marginally as the temperature is lowered.

Referring again to FIGS. 1-4, it is noted that under the conditions of the tests, 0.3% promoter appears to be the optimum concentration as there is no significant increase in the rate of cure above this concentration. This fact is further confirmed by the hardness values and DSC analysis of cured samples since the hardness and $T_g$'s of cured samples go through a maximum at about 0.3% promoter for most samples as shown in Tables I-III. At both cure temperatures studied, DMPT/DMMT blends of 80:20 and 60:40 performed essentially similar to DMPT at promoter concentrations of 0.3% and above. Although 0.3% promoter is the optimum concentration, the promoter can be used in amounts of from about 0.05 to 2.0%, it being necessary, however, that the amount used increase the cure rate at 10° C. in relation to DMA by a factor of at least two.

DMPT and DMPT/DMMT isomeric blends as shown by Tables I-III and FIGS. 1-5 were always superior to DMA in curing the unsaturated polyester resin. However, the gel and cure times produced using blends generally increased with an increase in the proportion of meta isomer. Tertiary aromatic amines attack BP to form an N-benzoyloxydimethylanilinium ion(I) which then decomposes to give a radical cation of the tertiary amine (II) and a benzoyloxy radical (III) which initiates the cure reaction.

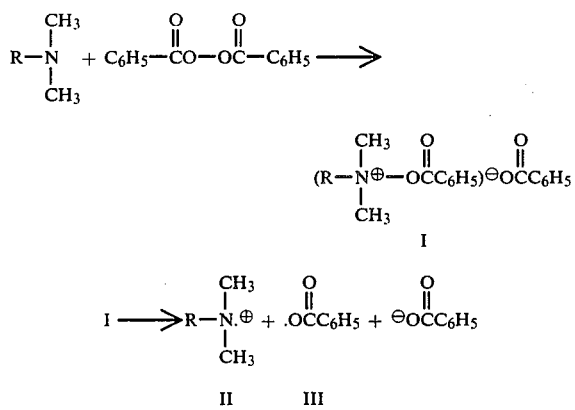

where, $R=C_6H_5$ for DMA and $C_6H_5CH_3$ for DMPT and DMMT.

The presence of electron-releasing substituents on the aniline ring, such as the methyl found in DMPT or DMMT, facilitates the nucleophilic attack of nitrogen on peroxide oxygen, resulting in shorter gel times. This is apparently the reason for the higher efficiency of DMPT and DMMT over the conventional DMA. The effect is more pronounced when the group is para rather than meta to the amine group.

Peak exotherms and Barcol hardness values of samples cured with different promoter concentrations are listed in Tables I and II for cure temperatures 15° C. and 10° C., respectively. Peak exotherms in the range 80°-105° C. were observed at both cure temperatures. The highest peak exotherms, i.e., value above 100° C., were obtained using DMPT and DMPT/DMMT blends at either 0.2 or 0.3% concentration. In a low temperature initiator system, higher peak exotherms are desirable as an aid toward complete curing of thick sections. In contrast, high peak exotherms may cause cracking and warping in high temperature initiator systems.

Barcol hardness values were in the range 20-39 and 20-30 for 15° C. and 10° C. cure temperatures, respectively. In most cases, Barcol hardness displayed a maximum value at about 0.3% promoter concentration. When higher promoter concentrations were used, the hardness of cured samples was lower. If hardness is considered as a measure of crosslink density in the cured system, it appears that over-promotion results in a lower degree of cure.

DSC was used on cured samples to estimate the degree of cure. With other factors held constant, the higher the glass transition temperature of a thermoset polymer, the greater the extent of cure, i.e., the higher the crosslink density. The $T_g$ values measured for samples cured with different DMPT concentrations have again confirmed that about 0.3% promoter is the optimum concentration for curing the polyester resin under investigation. Therefore, in all other promoter systems, 0.3% concentration was taken as representative, and the $T_g$'s were measured for comparison. DSC thermograms of a representative system (0.3% DMPT/DMMT, 60:40) are shown in FIG. 6. Scan A of FIG. 6 is typical of the first scan taken of a sample after curing. It shows a broad exotherm which represents a post-cure of the sample at elevated temperature. Referring to Table III, the starting temperature of the post-cure reaction is denoted as $T_i$, and the temperature at which the maximum rate of reaction occurs as $T_m$ (postcure peak exotherm). It is known that $T_m$ will shift to higher temperatures as a function of the degree of cure obtained in the original curing reaction. Thus, the more complete the original curing reaction, the smaller the total post-cure exotherm and the higher the $T_m$. $T_i$, $T_m$, and $T_g$ for samples cured at 15° C. are presented in Table III for comparison of various promoter systems. As shown in Table III, the $T_m$'s are shifted toward higher temperatures in the samples promoted with DMPT and DMPT/DMMT blends when compared to DMA promoted samples, and the $T_m$'s decrease in the order DMPT>DMPT/DMMT blends>DMMT=DMA.

When the sample was allowed to cool and a second DSC scan B was performed, as shown in FIG. 6, an exotherm was not observed and the $T_g$ could be measured in the conventional manner.

Tables I - III are as follows:

TABLE I

Peak Exotherm and Barcol Hardness Values for Samples Cured at 15° C.

| Promoter | Concentration (%) | Peak Exotherm (°C.) | Barcol Hardness |
|---|---|---|---|
| DMPT | 0.1 | 91 | 29 |
| | 0.2 | 93 | 39 |
| | 0.3 | 88 | 37 |
| | 0.4 | 86 | 29 |
| | 0.5 | 81 | 19 |
| DMPT/DMMT 80:20 | 0.1 | 93 | 0 |
| | 0.2 | 99 | 33 |
| | 0.3 | 98 | 32 |
| | 0.4 | 93 | 33 |
| | 0.5 | 88 | 28 |
| DMPT/DMMT 60:40 | 0.1 | 91 | 22 |
| | 0.2 | 99 | 25 |

TABLE I-continued

Peak Exotherm and Barcol Hardness Values for Samples Cured at 15° C.

| Promoter | Concentration (%) | Peak Exotherm (°C.) | Barcol Hardness |
|---|---|---|---|
| | 0.3 | 100 | 30 |
| | 0.4 | 87 | 33 |
| | 0.5 | 86 | 33 |
| DMPT/DMMT 40:60 | 0.1 | 99 | 28 |
| | 0.2 | 99 | 30 |
| | 0.3 | 96 | 27 |
| | 0.4 | 92 | 35 |
| | 0.5 | 95 | 30 |
| DMPT/DMMT 20:80 | 0.1 | 81 | 24 |
| | 0.2 | 97 | 31 |
| | 0.3 | 101 | 30 |
| | 0.4 | 88 | 30 |
| | 0.5 | 90 | 25 |
| DMMT | 0.1 | 94 | 19 |
| | 0.2 | 94 | 32 |
| | 0.3 | 91 | 32 |
| | 0.4 | 95 | 34 |
| | 0.5 | 86 | 34 |
| DMA | 0.1 | 92 | 25 |
| | 0.2 | 84 | 35 |
| | 0.3 | 84 | 36 |
| | 0.4 | 86 | 29 |
| | 0.5 | 88 | 37 |

TABLE II

Peak Exotherm and Barcol Hardness Values for Samples Cured at 10° C.

| Promoter | Concentration (%) | Peak Exotherm (°C.) | Barcol Hardness |
|---|---|---|---|
| DMPT | 0.1 | 86 | 23 |
| | 0.2 | 101 | 27 |
| | 0.3 | 85 | 24 |
| | 0.4 | 86 | 30 |
| | 0.5 | 83 | 24 |
| DMPT/DMMT 80:20 | 0.1 | 89 | 22 |
| | 0.2 | 95 | 28 |
| | 0.3 | 89 | 25 |
| | 0.4 | 91 | 21 |
| | 0.5 | 84 | 23 |
| DMPT/DMMT 60:40 | 0.1 | 80 | 23 |
| | 0.2 | 104 | 26 |
| | 0.3 | 83 | — |
| | 0.4 | 81 | 27 |
| | 0.5 | 85 | 28 |
| DMPT/DMMT 40:60 | 0.1 | 90 | 26 |
| | 0.2 | 96 | 27 |
| | 0.3 | 105 | 30 |
| | 0.4 | 81 | 23 |
| | 0.5 | 90 | 27 |
| DMPT DMMT 20:80 | 0.1 | 89 | 26 |
| | 0.2 | 83 | 24 |
| | 0.3 | 97 | 24 |
| | 0.4 | 91 | 26 |
| | 0.5 | 90 | 24 |
| DMMT | 0.1 | 97 | 28 |
| | 0.2 | 94 | 26 |
| | 0.3 | 95 | 25 |
| | 0.4 | 96 | 24 |
| | 0.5 | 86 | 27 |
| DMA | 0.1 | — | 13 |
| | 0.2 | 97 | 25 |
| | 0.3 | 97 | 23 |
| | 0.4 | 90 | 26 |
| | 0.5 | 93 | 26 |

TABLE III

Post-Cure DSC Analysis of Polyester Resins Cured at 15° C.

| Promoter | Concentration (%) | $T_i$ (°C.) | $T_m$ (°C.) | $T_g$ (°C.) |
|---|---|---|---|---|
| DMPT | 0.1 | 111 | 126 | 160 |
| | 0.3 | 124 | 147 | 168 |
| | 0.5 | 120 | 136 | 162 |

TABLE III-continued

Post-Cure DSC Analysis of Polyester Resins Cured at 15° C.

| Promoter | Concentration (%) | $T_i$ (°C.) | $T_m$ (°C.) | $T_g$ (°C.) |
|---|---|---|---|---|
| DMPT/DMMT 80:20 | 0.3 | 106 | 139 | 165 |
| DMPT/DMMT 60:40 | 0.3 | 103 | 139 | 165 |
| DMPT/DMMT 40:60 | 0.3 | 100 | 140 | 163 |
| DMPT/DMMT 20:80 | 0.3 | 100 | 138 | 162 |
| DMMT | 0.3 | 103 | 137 | 163 |
| DMA | 0.3 | 104 | 137 | 158 |

The invention of the present application has been described with respect to the advantages of the cure promoter when used at below room temperature. However, it has been found that the blends of para and meta N,N-dimethyl-toluidines also perform satisfactorily at room and above room temperature. These blends have the same economic advantage when utilized as cure promoters above room temperatures as they do at the lower temperatures.

The polyesters which are useful according to the present invention include the conventional unsaturated polyester resins known in the art. Thus, the unsaturated polyesters may be obtained by reaction of approximately equivalent amounts of a polyvalent alcohol such as ethylene glycol, diethylene glycol, triethylene glycol, trimethylene glycol, propylene glycol, pentaerythritol, and other diols or polyols with an unsaturated dibasic carboxylic acid or carboxylic anhydride such as maleic acid, maleic anhydride, fumaric acid, itaconic acid, or citraconic acid. These unsaturated dibasic carboxylic acids or anhydrides are often used in combination with aromatic and/or saturated aliphatic dicarboxylic acids or the anhydrides derived therefrom, such as phthalic acid, phthalic anhydride, isophthalic acid, tetrachlorophthalic acid, malonic acid, adipic acid, sebacic acid, tartaric acid, etc.

Unsaturated polyesters containing vinyl group or vinylidene groups may be obtained by polycondensation of alpha,beta-unsaturated monocarboxylic acids such as acrylic or methacrylic acid, with mono-, di- or polyhydric alcohols. As examples of these alcohols may be mentioned: methanol, ethanol, isopropanol, cyclohexanol, phenol, ethylene glycol, propylene glycol, 2,2-bis(4-hydroxyphenyl)propane, 2,2-bis(4-hydroxycyclohexyl)propane, 2,2-bis(4-beta-hydroxyethyloxy-phenyl-propane, pentaerythritol and dimers thereof, trimethol propane and glycerol, and the complex diols or polyols. Unsaturated polyesters containing vinyl groups or vinylidene groups also may be obtained by reacting alpha,beta-unsaturated monocarboxylic acids with compounds containing epoxy groups, such as bisphenol A bis(glycidyl ether).

Further, the unsaturated polyesters can be dissolved in monomers copolymerizable with the polyester, which contain one or more $CH_2=C<$ groups such as styrene, vinyl toluene, methylmethacrylate, ethyleneglycolmethacrylate, etc., as is also conventional. The preferred solutions are those which contain from about 70-50% by weight of unsaturated polyester and 30-50% by weight of copolymerizable monomer. Styrene is the preferred copolymerizable monomer.

In order to improve the stability of the unsaturated polyesters, inhibitors are commonly employed in amounts ranging from 0.001 to 0.03% by weight. The most commonly used inhibitors are hydroquinone, hydroquinone monomethyl ether, quinone, and p-tert.-butyl catechol. As noted above, to more accurately control the comparison tests, no inhibitor was employed in the comparative examples.

The polymerization or copolymerization initiators which can be used are those conventionally available and include hydrogen peroxide, the ketone peroxides, such as acetylacetone peroxide, methylethylketone peroxide, cyclohexanone peroxide and methylisobutylketone peroxide; the diacyl peroxides, such as benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; the peresters, such as tert.-butyl peroxide-2-ethyl hexanoate; the perketals, such as 1,1-ditert.-butylperoxy-3,3,5-trimethyl cyclohexane and dialkyl peroxides, such as 1,3-bis(tert.-butylperoxyisopropyl)benzene. The diacyl peroxides, and particularly benzoyl peroxide, are the preferred initiators.

As will be apparent to one skilled in the art, various modifications can be made within the scope of the aforesaid description. Such modifications being within the ability of one skilled in the art form a part of the present invention and are embraced by the appended claims.

It is claimed:

1. In the method of curing unsaturated polyester resins with a peroxide initiator at room temperature or below room temperature, the improvement wherein said curing is carried out in the presence of a promoter selected from the group consisting of N,N-dimethyl-p-toluidine and a blend of N,N-dimethyl-p-toluidine and N,N-dimethyl-m-toluidine, said blend containing at least 40% N,N-dimethyl-p-toluidine with said promoter being present in an amount sufficient to increase the cure rate in relation to dimethylaniline by a factor of at least 2 at 10° C.

2. The method of claim 1 wherein the curing is at a temperature below 20° C.

3. The method of claim 1 wherein the blend of N,N-dimethyl-p-toluidine and N,N-dimethyl-m-toluidine is in a ratio of 80:20.

4. The method of claim 1 wherein the blend of N,N-dimethyl-p-toluidine and N,N-dimethyl-m-toluidine is in a ratio of 65:35.

5. The method of claim 1 wherein the blend of N,N-dimethyl-p-toluidine and N,N-dimethyl-m-toluidine is in a ratio of 60:40.

6. The method of claim 1 wherein the blend of N,N-dimethyl-p-toluidine and N,N-dimethyl-m-toluidine is in a ratio of 40:60.

7. The method of claim 1 wherein the promoter is N,N-dimethyl-p-toluidine.

8. The method of claim 1 wherein the peroxide initiator is benzoyl peroxide.

9. The method of claim 2 wherein the peroxide initiator is benzoyl peroxide.

10. A polymerizable composition characterized by accelerated polymerization comprising a polymerizable unsaturated polyester resin, a peroxide initiator, and a cure promoter selected from the group consisting of N,N-dimethyl-p-toluidine and a blend of N,N-dimethyl-p-toluidine and N,N-dimethyl-m-toluidine, said blend containing at least 40% N,N-dimethyl-p-toluidine with said promoter being present in an amount sufficient to increase the cure rate in relation to dimethylaniline by a factor of at least 2 at 10° C.

11. The composition of claim 10 wherein the peroxide initiator is benzoyl peroxide.

12. The composition of claim 11 wherein the blend of N,N-dimethyl-p-toluidine and N,N-dimethyl-m-toluidine is in a ratio of 80:20.

13. The composition of claim 11 wherein the blend of N,N-dimethyl-p-toluidine and N,N-dimethyl-m-toluidine is in a ratio of 65:35.

14. The composition of claim 11 wherein the blend of N,N-dimethyl-p-toluidine and N,N-dimethyl-m-toluidine is in a ratio of 60:40.

15. The composition of claim 11 wherein the blend of N,N-dimethyl-p-toluidine and N,N-dimethyl-m-toluidine is in a ratio of 40:60.

16. In the method of curing unsaturated polyester resins with a peroxide initiator, the improvement wherein said curing is carried out in the presence of a promoter which is a blend of N,N-dimethyl-p-toluidine and N,N-dimethyl-m-toluidine, said blend containing from about 40% to 80% N,N-dimethyl-p-toluidine.

17. A polymerizable composition characterized by accelerated polymerization comprising a polymerizable unsaturated polyester resin, a peroxide initiator, and a cure promoter which is a blend of N,N-dimethyl-p-toluidine and N,N-dimethyl-m-toluidine, said blend containing from about 40% to 80% N,N-dimethyl-p-toluidine.

* * * * *